(12) United States Patent
Monma et al.

(10) Patent No.: US 7,542,642 B2
(45) Date of Patent: Jun. 2, 2009

(54) MULTI-BEAM GENERATING DEVICE AND OPTICAL RECORDING DEVICE USING THE SAME

(75) Inventors: Susumu Monma, Hitachinaka (JP); Yasuyuki Shibayama, Hitachinaka (JP); Keiji Kataoka, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/836,301

(22) Filed: Aug. 9, 2007

(65) Prior Publication Data

US 2008/0159703 A1 Jul. 3, 2008

(30) Foreign Application Priority Data

| Aug. 10, 2006 | (JP) | ............................ 2006-218708 |
| May 29, 2007 | (JP) | ............................ 2007-141645 |

(51) Int. Cl.
*G02B 6/30* (2006.01)
*G02B 6/02* (2006.01)
*G02B 6/10* (2006.01)

(52) U.S. Cl. ............................ 385/49; 385/32; 385/43; 385/50; 385/132

(58) Field of Classification Search ................. 385/32, 385/43, 49, 50, 126, 129, 132
See application file for complete search history.

(56) References Cited

U.S. PATENT DOCUMENTS

| 4,763,975 A * | 8/1988 | Scifres et al. ............... 385/33 |
| 5,015,066 A * | 5/1991 | Cressman ................... 385/120 |
| 5,887,097 A * | 3/1999 | Henry et al. .................. 385/39 |
| 6,513,937 B1* | 2/2003 | Dehmlow .................... 353/94 |
| 6,819,861 B2* | 11/2004 | Ota et al. .................... 385/146 |

FOREIGN PATENT DOCUMENTS

| JP | 11-271652 | 10/1999 |
| JP | 11-344630 | 12/1999 |
| JP | 2000-066048 | 3/2000 |

OTHER PUBLICATIONS

Y. Ishii, et al.; Reduction of bending loss by area-selective deposition method; Optics and Electronics Laboratory, Fujikura Ltd.; Electronics 1, The Proceeding of the General Convention of the Institute of Electronics, Information and Communication Engineers published in 1998; pp. 1-2 and pp. 314.

* cited by examiner

*Primary Examiner*—Sung H Pak
*Assistant Examiner*—Daniel Petkovsek
(74) *Attorney, Agent, or Firm*—Antonelli, Terry, Stout & Kraus, LLP.

(57) ABSTRACT

A multi-beam generating device has plural semiconductor lasers, optical fibers to propagate laser beams generated by the semiconductor lasers, an optical fiber array to propagate the laser beams passed through the optical fibers, and an optical waveguide device provided with waveguides to propagate the laser beams having passed through the optical fiber array. Each of the waveguides has a core layer and a clad layer; a pitch between adjacent waveguides in the arrangement is narrower on the output section side where the laser beams emit than on the input section side where the laser beams enter; a width of the core layer is narrower in the transverse direction that is the direction of the arrangement of the waveguides than in the vertical direction; and a difference in refractive index between the core layer and the clad layer is larger in the transverse direction than in the vertical direction.

5 Claims, 9 Drawing Sheets

MULTI-BEAM GENERATING DEVICE AND OPTICAL RECORDING DEVICE USING THE SAME

CLAIM OF PRIORITY

The present application claims priority from Japanese application Ser. No. 2006-218708, filed on Aug. 10, 2006, and Ser. No. 2007-141645, filed on May 29, 2007, the contents of which are hereby incorporated by references into this application.

FIELD OF THE INVENTION

The present invention relates to a multi-beam generating device for generating a multi-beam with a plurality of violet semiconductor lasers, and an optical recording device for performing optical recording by multi-beam scanning.

BACKGROUND OF THE INVENTION

Speeding up of a rotating polygonal mirror, thereby speeding up of photo scanning is needed to realize a high-speed laser printer. Furthermore, in an optical modulation type laser printer performing an optical modulation in response to data to be printed, a high-speed modulation is needed to a high-speed laser printer.

A laser printer using a multi-beam is an effective means to a high-speed laser printer because it can reduce a rotational speed of a rotating polygonal mirror and an optical modulation speed by the number of beams in the multi-beam. For the multi-beam type laser printer to realize more high-speed printing, it is necessary to increase the number of beams in the multi-beam.

FIG. 3 shows a first example of a laser printer using a plurality of semiconductor lasers, particularly an optical system thereof. FIG. 7 shows a sectional view of an optical fiber array in a multi-beam generating section.

In FIG. 3, a semiconductor laser module 1 comprises a plurality of semiconductor lasers 2 and optical fibers 3 for leading the respective laser beam from semiconductor lasers 2. A plurality of optical fibers 3 are aligned in a row at an optical fiber array unit 4.

As shown in FIG. 7, the optical fiber array unit 4 is configured such that the optical fibers 3 whose sheath has been removed, are held in V-shaped grooves 11 formed by applying anisotropic etching to Si crystal, while being pressed against the V-shaped grooves 11 with a glass plate 12 and being fixed with an adhesive 13.

Each optical fiber 3 comprises a clad portion 31 and a core portion 32, and light propagates via the core portion 32. An outer diameter of the clad portion is generally about 125 μm and hence the distance between adjacent core portions is 125 μm even when the optical fibers are aligned in nearness layout to each other.

In the case of an optical system shown in FIG. 3 wherein a multi-beam having the above beam distance is used, since each beam distance in the multi-beam is comparatively large, if the number of beams in the multi-beam increases, the beams at both sides of the optical fiber layout largely deviate from an optical axis of the optical system. Accordingly, deterioration of aberration characteristics of optical system components may be caused.

For the reason, when using the lenses 6 and 8 in FIG. 3 for the multi-beam laser printer, it becomes necessary to use lenses with a high degree of accuracy to maintain good aberration characteristics even when the beams deviate largely from the optical axis in comparison with the case of using only one beam.

Consequently, it is impossible to increase the number of beams in a multi-beam and high speed printing is limited.

In a second example of an optical system in a laser printer using a multi-beam, a method of using a semiconductor laser array as a multi-beam generating device as shown in FIG. 5 is also possible. However, pitch narrowing is limited due to the problems such as thermal crosstalk, droop, and the like, and the same problem as the first example occurs.

As a method for solving such problems, an optical recording device shown in FIG. 4 is proposed as follows. In the optical recording device, an optical waveguide device 5 is connected to an output end of an optical fiber array 4 in which optical fibers are aligned in nearness layout to each other; and a narrow-pitched multi-beam emitted from the optical waveguide device is scanned on a photosensitive material 9 in batch. This method is disclosed in Japanese Patent Laid-Open Publication No. 11-271652.

Additionally, another recording device shown in FIG. 6 is proposed as follows. In the optical recording device, an optical waveguide device 5 is connected to an output end of a semiconductor laser array 36. Thus, using a narrow-pitched multi-beam emitted from the optical waveguide device 5 is also possible.

In the above-mentioned prior arts using the optical waveguide device, when pitch conversion of the multi-beam is applied by using a downsized optical waveguide device under a trend where the number of beams in a multi-beam increases, it is necessary to increase a curvature of a waveguide and thereby loss in the optical waveguide device may be caused.

In order to realize a curved waveguide of low loss even with a small curvature radius, it is necessary to increase a difference in refractive index between a core layer and a clad layer and narrow a waveguide width.

However, merely increasing the difference in refractive index between the core layer and the clad layer and narrowing the waveguide width, the loss of connection between the optical waveguide device and optical fibers or a semiconductor laser array undesirably increases. Accordingly, even if bend loss in an optical waveguide device can be reduced, that may not result in the improvement of the optical utilization efficiency of the whole multi-beam light source section in some cases.

A method for solving such problems is described in Paper No. C-3-148, Electronics 1, the Proceedings of the General Convention of the Institute of Electronics, Information and Communication Engineers published in 1998, or in Japanese Patent Laid-Open Publication No. 2000-66048.

The above two documents disclose the following optical waveguide device. The optical waveguide device is configured such that: the difference in refractive index between a waveguide and an over-clad layer is increased only in a curved area of the optical waveguide device to narrow a waveguide width; on the other hand, the difference in refractive index between the waveguide and the over-clad layer are reduce at the optical joint with optical fibers and the like to widen the waveguide width.

However, when using violet semiconductor lasers having a wavelength of 380 to 460 nm in a plurality of single mode optical fibers for leading a multi-beam to an optical waveguide device, it is necessary to increase an allowance of axial deviation at the time when a semiconductor laser beam enters an optical fiber core portion at a semiconductor laser module 1. For the reason, it is needed to reduce the difference in refractive index between a core and a clad, and form a structure in the vicinity of the cutoff of a TEM01 or TEM10 mode where the core diameter is increased.

Additionally, in order to increase the allowance of axial deviation between an optical fiber and the optical fiber joint of the optical waveguide device, it is needed to reduce the difference in refractive index therebetween and increase the core diameter.

Further, in the case of connecting a semiconductor laser array to an optical waveguide device too, in order to increase the allowance of their axial deviation, it is needed to connect a semiconductor laser array having a large outgoing beam diameter like a surface-emitting semiconductor laser array to an optical waveguide device having a large core diameter.

Furthermore, when reducing the difference in refractive index and increasing the core diameter also at the emitting section of an optical waveguide device, it is possible to generate a small pitch multi-beam in rows of beams in relation to a beam diameter in the multi-beam, namely to generate a multi-beam where beams are aligned in a very dense row.

As a result, the influence of aberration in an optical system is suppressed even in the case of a large number of beams and high quality optical recording can be obtained at a high speed.

However, when a multi-beam is subjected to pitch conversion and narrow-pitched in the state of a small refractive index difference and an increased core diameter, a bend loss increases in a curved area in the optical waveguide device.

Further, as shown in FIG. 12, when a waveguide width 19 is narrowed in the curved area in the optical waveguide device and the difference in refractive index between a waveguide 26 and an over-clad layer 27 is increased, a multimode is formed in the vertical direction since a waveguide thickness 20 is not changed and it becomes necessary to convert the beams into a single mode again at an emitting section and thereby loss increases.

An object of the present invention is, even when using violet semiconductor lasers as the light sources, to provide a multi-beam generating device capable of improving optical utilization efficiency at a multi-beam generating section, and to provide an optical recording device using a multi-beam emitted from the multi-beam generating device. The improvement of optical utilization efficiency at a multi-beam generating section is realized by reducing bend loss in an optical waveguide device while the coupling efficiency between optical fibers and the optical waveguide device or between a semiconductor laser array and the optical waveguide device is maintained at a high level.

Further, another object of the present invention is, even when using a large number of beams, to provide a multi-beam generating device to emit a multi-beam from an optical waveguide device that is hardly susceptible to the aberration in an optical system, and to provide an optical recording device realizing high quality optical recording at a high speed using a multi-beam emitted from the multi-beam generating device. The optical waveguide device hardly susceptible to the aberration, is realized by generating a multi-beam having a small pitch multi-beam in relation to the beam diameter in the multi-beam, namely a multi-beam where beams are aligned in a very dense state.

SUMMARY OF THE INVENTION

A first means according to the present invention is that: a multi-beam generating device comprises a plurality of semiconductor lasers, a plurality of optical fibers to propagate laser beams emitted by the semiconductor lasers, an optical fiber array to propagate the laser beams having passed through the optical fibers, and an optical waveguide device provided with a plurality of waveguides to propagate the laser beams having passed through the optical fiber array. Here, each of the waveguides has a core layer and a clad layer, and a pitch between adjacent waveguides in the arrangement of the waveguides is narrower on the output section side where the laser beams emit than on the input section side where the laser beams enter. A width of the core layer is narrower in the transverse direction that is the direction of the arrangement of the waveguides than in the vertical direction. A difference in refractive index between the core layer and the clad layer is larger in the transverse direction than in the vertical direction.

A second means according to the present invention is that: a multi-beam generating device comprises a plurality of semiconductor lasers, a plurality of optical fibers to propagate laser beams emitted by the semiconductor lasers, an optical fiber array to propagate the laser beams having passed through the optical fibers, and an optical waveguide device provided with a plurality of waveguides to propagate the laser beams having passed through the optical fiber array. Here, each waveguide with a core layer and a clad layer has an input section where a laser beam enters, a curved area in the waveguide, and an output section where the laser beam emits, and a pitch between adjacent waveguides in the arrangement of the waveguides is narrower on the output section side than on the input section side. In the curved area in the waveguide, a width of the core layer in the transverse direction, which is the direction of the arrangement of the waveguides, narrows toward the curved area in the waveguide, and a difference in refractive index between the core layer and the clad layer is larger in the transverse direction than in the vertical direction. Further, at the input section, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

A third means according to the present invention is that: a multi-beam generating device comprises a plurality of semiconductor lasers, a plurality of optical fibers to propagate laser beams emitted by the semiconductor lasers, an optical fiber array to propagate the laser beams having passed through the optical fibers, and an optical waveguide device provided with a plurality of waveguides to propagate the laser beams having passed through the optical fiber array. Here, each waveguide with a core layer and a clad layer has an input section where a laser beam enters, a curved area in the waveguide, and an output section where the laser beam emits, and a pitch between adjacent waveguides in the arrangement of the waveguides is narrower on the output section side than on the input section side. In the curved area in the waveguide, a width of the core layer in the transverse direction, which is the direction of the arrangement of the waveguides, narrows toward the curved area in the waveguide, and a difference in refractive index between the core layer and the clad layer is larger in the transverse direction than in the vertical direction. Further at the output section, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

A fourth means according to the present invention is that: a multi-beam generating device comprises a plurality of semiconductor lasers, a plurality of optical fibers to propagate laser beams emitted by the semiconductor lasers, an optical fiber array to propagate the laser beams having passed through the optical fibers, and an optical waveguide device provided with a plurality of waveguides to propagate the laser beams having passed through the optical fiber array. Here, each waveguide with a core layer and a clad layer has an input section where a laser beam enters, a curved area in the waveguide, and an output section where the laser beam emits. In the curved area of the waveguide, a width of the waveguide is narrower in the transverse direction than in the vertical direction, a difference in refractive index is larger in the transverse direction than in the vertical direction, and a pitch between adjacent waveguides in the arrangement of the waveguides is narrower on the output section side than on the input section side. Further, at both the input and output sections, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

A fifth means according to the present invention is that: a multi-beam generating device has a semiconductor laser array and an optical waveguide device provided with a plurality of waveguides to propagate laser beams emitted from the semiconductor laser array. Here, each of the waveguides has a core layer and a clad layer, and a pitch between adjacent waveguides in the arrangement of the waveguides is narrower on the output section side where the laser beams emit than on the input section side where the laser beams enter. A width of the core layer is narrower in the transverse direction that is the direction of the arrangement of the waveguides than in the vertical direction. A difference in refractive index between the core layer and the clad layer is larger in the transverse direction than in the vertical direction.

A sixth means according to the present invention is that: a multi-beam generating device has a semiconductor laser array and an optical waveguide device provided with a plurality of waveguides to propagate laser beams emitted from the semiconductor laser array. Here, each waveguide with a core layer and a clad layer has an input section where a laser beam enters, a curved area in the waveguide, and an output section where the laser beam emits, and a pitch between adjacent waveguides in the arrangement of the waveguides is narrower on the output section side than on the input section side. In the curved area in the waveguide, a width of the core layer in the transverse direction, which is the direction of the arrangement of the waveguides, narrows toward the curved area in the waveguide, and a difference in refractive index between the core layer and the clad layer is larger in the transverse direction than in the vertical direction. Further, at the input section, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

A seventh means according to the present invention is that: A multi-beam generating device has a semiconductor laser array and an optical waveguide device provided with a plurality of waveguides to propagate laser beams emitted from the semiconductor laser array. Here, each waveguide with a core layer and a clad layer has an input section where a laser beam enters, a curved area in the waveguide, and an output section where the laser beam emits, and a pitch between adjacent waveguides in the arrangement of the waveguides is narrower on the output section side than on the input section side. In the curved area in the waveguide, a width of the core layer in the transverse direction, which is the direction of the arrangement of the waveguides, narrows toward the curved area in the waveguide, and a difference in refractive index between the core layer and the clad layer is larger in the transverse direction than in the vertical direction. Further, at the output section, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

An eighth means according to the present invention is that: a multi-beam generating device has a semiconductor laser array and an optical waveguide device provided with a plurality of waveguides to propagate laser beams emitted from the semiconductor laser array. Here, each waveguide with a core layer and a clad layer has an input section where a laser beam enters, a curved area in the waveguide, and an output section where the laser beam emits. In the curved area of the waveguide, a width of the waveguide is narrower in the transverse direction than in the vertical direction, a difference in refractive index is larger in the transverse direction than in the vertical direction, and a pitch between adjacent waveguides in the arrangement of the waveguides is narrower on the output section side than on the input section side. Further, at both the input and output sections, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

A ninth means according to the present invention is, in a multi-beam generating device according to any one of the fifty to eighth means 5 to 8, characterized in that the semiconductor laser array is a surface-emitting semiconductor laser array.

A tenth means according to the present invention is, in a multi-beam generating device according to the first to ninth means 1 to 9, characterized in that the semiconductor lasers are violet semiconductor lasers.

An eleventh means according to the present invention is characterized by an optical recording device that carries out optical recording by: emitting laser beams from a multi-beam generating device according to any one of the first to tenth means; and scanning an optical recording material in multi-beam.

The present invention can provide a multi-beam generating device capable of improving optical utilization efficiency at a multi-beam generating section, even in the case where violet semiconductor lasers are used as the light sources; and an optical recording device using a multi-beam emitted from the multi-beam generating device. The advantages are realize by reducing the bend loss in an optical waveguide device while the coupling efficiency between optical fibers and the optical waveguide device or between a semiconductor laser array and the optical waveguide device is maintained at a high level.

Further, the present invention can provide a multi-beam generating device to emit a multi-beam from an optical waveguide device that is hardly susceptible to the aberration in an optical system even with a large number of beams by generating a multi-beam having a small ratio of the beam distance in the multi-beam to the beam diameter in the multi-beam, namely a multi-beam wherein beams are aligned in a very dense state; and an optical recording device realizing high quality optical recording at a high speed using a multi-beam emitted from the multi-beam generating device.

BRIEF DESCRIPTION OF THE DRAWINGS

FIGS. 16A, 16B, 16C, 16D, 16E, 16F, 16G, and 16H comprise explanatory views explaining processes for manufacturing the input or output section of an optical waveguide device according to an embodiment of the present invention.

DETAILED DESCRIPTION OF THE INVENTION

Figure 7:
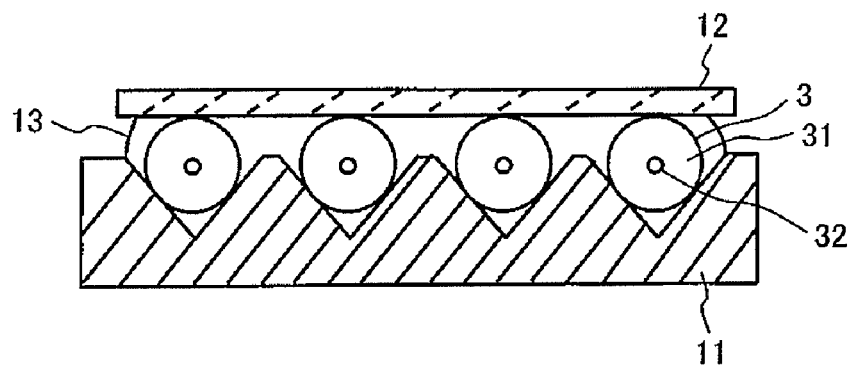
FIG. 7 is a sectional view showing an optical fiber array according to an embodiment of the present invention.
Figure 8:
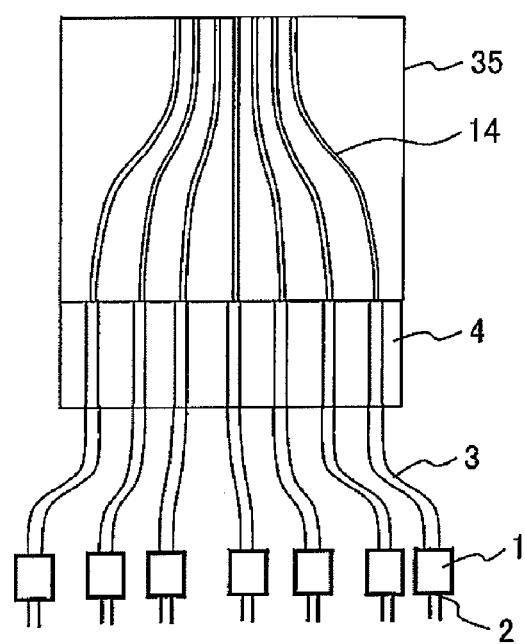
FIG. 8 is a schematic view showing a multi-beam generating device according to an embodiment of the present invention.
Figure 9:
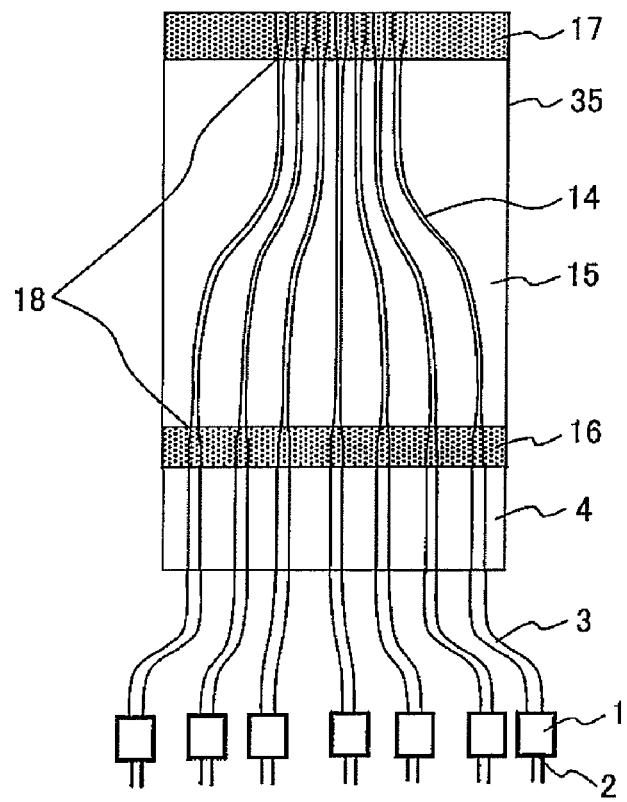
FIG. 9 is a schematic view showing a multi-beam generating device having tapered portions at the input and output sections of an optical waveguide device according to an embodiment of the present invention.

The first embodiment of a multi-beam generating device according to the present invention is explained in reference to FIGS. 7 to 9.

In this embodiment, a semiconductor laser module 1 leads a laser beam from a semiconductor laser 2 to an optical fiber 3. An optical waveguide device 35 has waveguides 14. The multi-beam generating device has a plurality of laser modules 1, optical fibers 3, and waveguides 14 in lows thereof respectively.

The optical fiber 3 comprises a core portion 32 and a clad portion 31. When using a violet semiconductor laser, it is necessary to dull the sensitivity to axial deviation at the input section of the optical fiber. For this reason, adopted is a structure in the vicinity of cutoff of a TEM01 or TEM10 mode where the difference in refractive index between the core portion 32 and the clad portion 31 of the optical fiber is reduced and the diameter of the core is increased.

An optical fiber array is configured such that a sheath of each optical fiber 3 has been removed at output section thereof, the sheath-removed portion of the optical fiber is held in each V-shaped groove 11 formed by applying anisotropic etching to Si crystal, while being pressed against the V-shaped grooves 11 with a glass plate 12 and being fixed with an adhesive 13. An output end face of the optical fiber array 4 is connected to an input face of the optical waveguide device 35.

Figure 10:
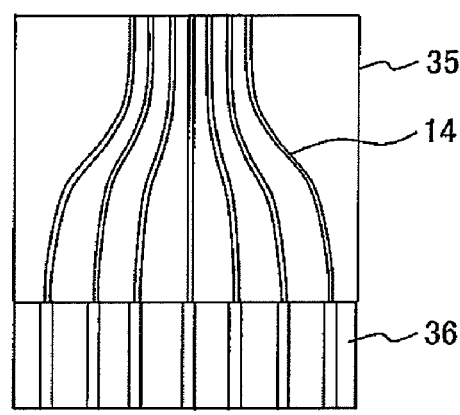
FIG. 10 is a schematic view showing a multi-beam generating device according to an embodiment of the present invention.
Figure 11:
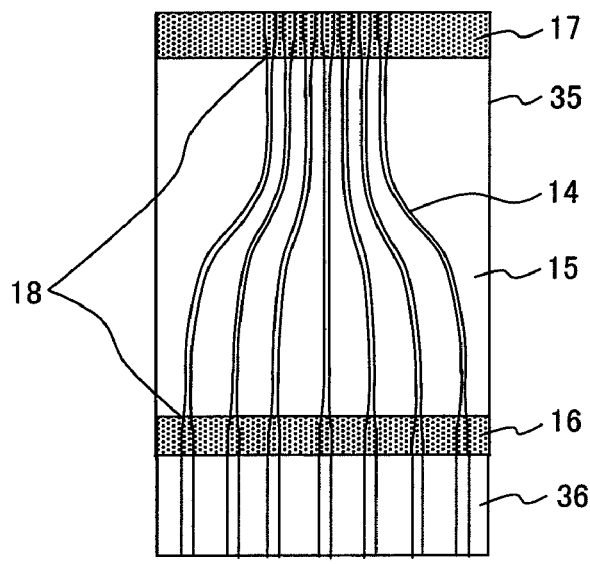
FIG. 11 is a schematic view showing a multi-beam generating device having tapered portions at the input and output sections of an optical waveguide device according to an embodiment of the present invention.

Another multi-beam generating device according to the present invention is shown in FIGS. 10 and 11. A multi-beam emitted from a surface-emitting semiconductor laser array 36 enters an optical waveguide device 35.

Figure 12:
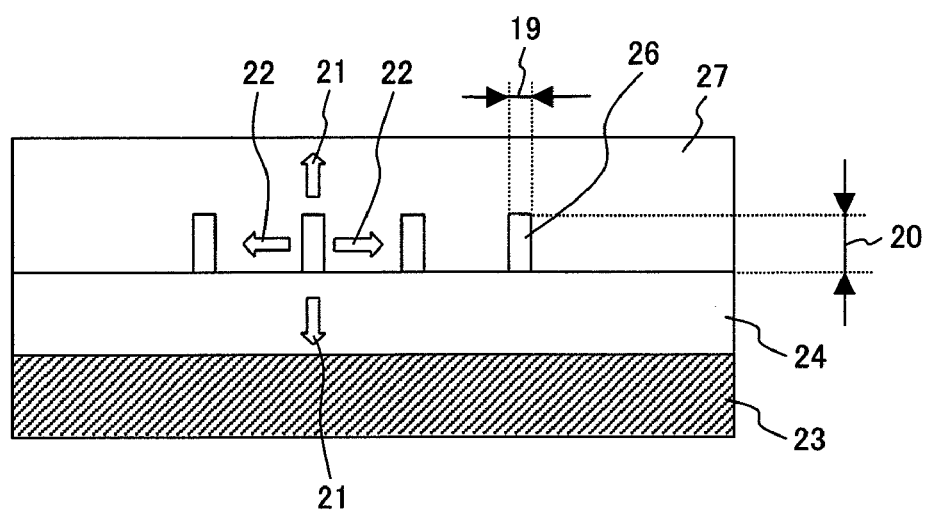
FIG. 12 is an explanatory view explaining a sectional structure at a curved area in a conventional optical waveguide device.
Figure 13:
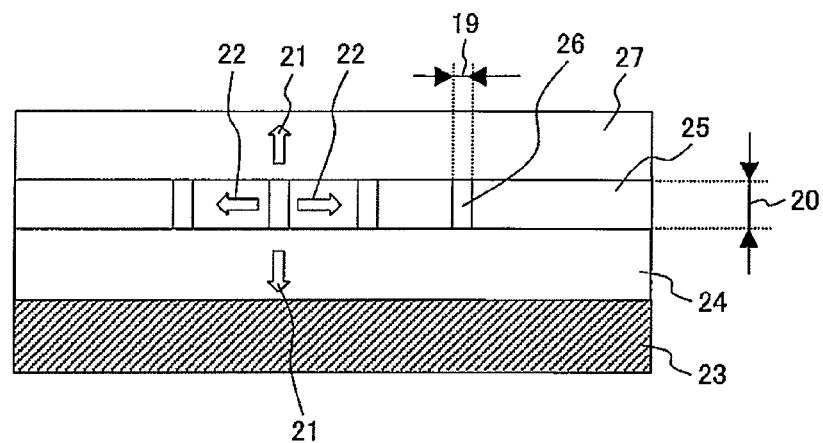
FIG. 13 is an explanatory view explaining a sectional structure of an optical waveguide device according to an embodiment of the present invention.
Figure 14:
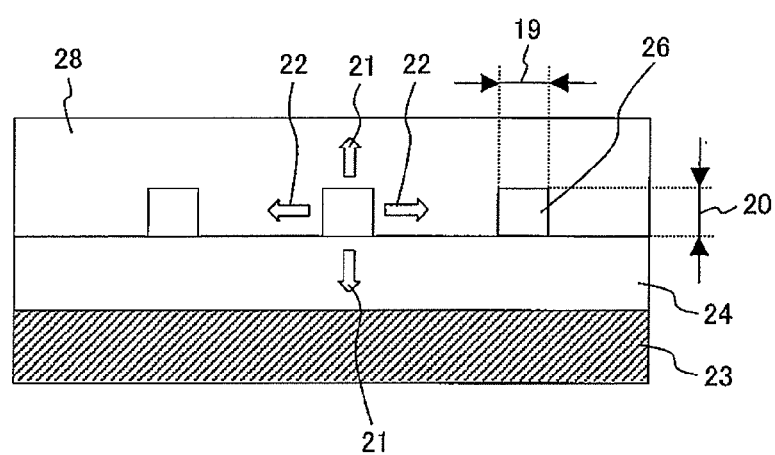
FIG. 14 is an explanatory view explaining a sectional structure of the input or output section of an optical waveguide device according to an embodiment of the present invention.
Figure 15A:
FIGS. 15A, 15B, 15C, 15D, 15E, 15F, 15G, and 15H comprise explanatory views explaining processes for manufacturing an optical waveguide device according to an embodiment of the present invention.
Figure 15B:
Figure 15C:
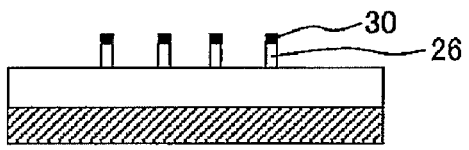
Figure 15D:
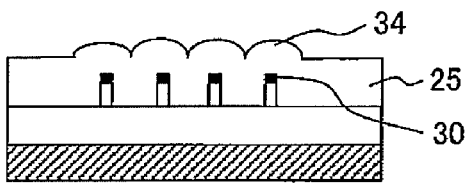
Figure 15E:
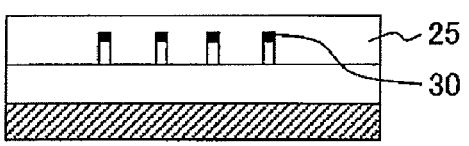
Figure 15F:
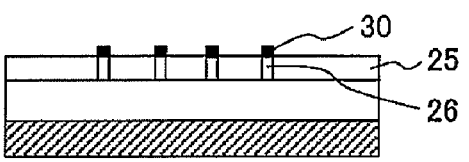
Figure 15G:
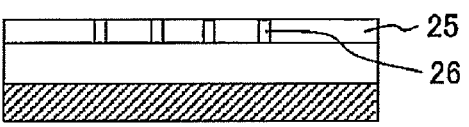
Figure 15H:
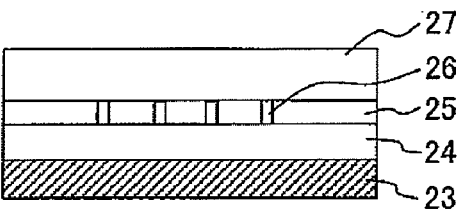
Figure 16A:
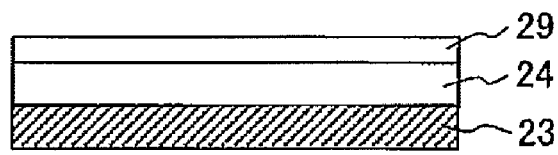
Figure 16B:
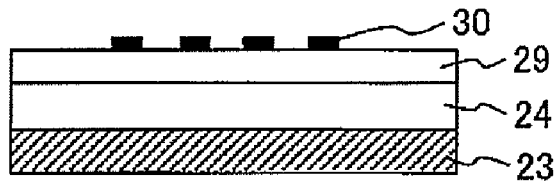
Figure 16C:
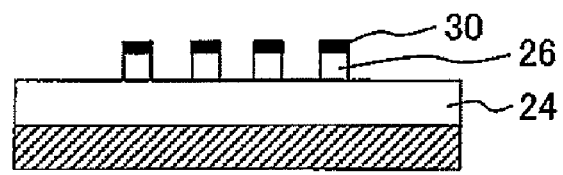
Figure 16D:
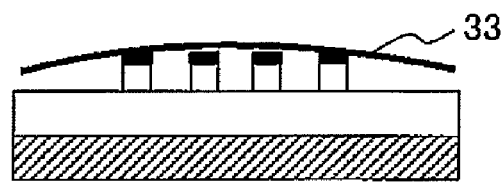
Figure 16F:
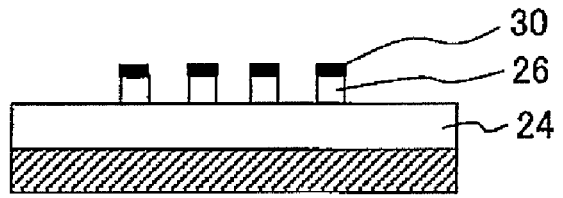
Figure 16G:
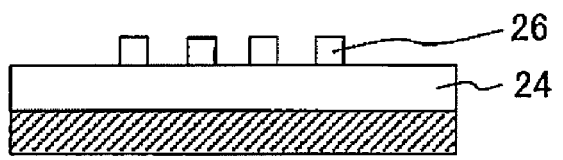
Figure 16H:
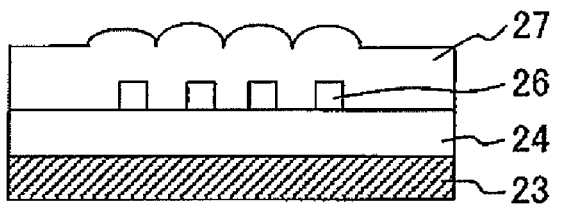

Sectional structures of optical waveguide devices according to embodiments of the present invention are shown in FIGS. 12 to 14.

FIG. 13 is a sectional view in a area where the width of a waveguide is narrower in the transverse direction than in the vertical direction and the difference in refractive index is larger in the transverse direction than in the vertical direction.

In order to increase the allowance of axial deviation of each optical waveguide device, the optical waveguide device has a structure in the vicinity of cutoff of a TEM01 mode, wherein the difference in refractive index in the vertical direction 21 between the waveguide 26 and the clad layers (24, 27) is reduced and the waveguide width 20 in the vertical direction is increased.

In the transverse direction 22, in order to decrease bend loss of the waveguide, the waveguide width 19 is narrowed and the difference in refractive index between the waveguide 26 and the clad layer 25 is increased. By employing such a structure, it is possible to maintain a state in the vicinity of cutoff of a TEM01 mode in the vertical direction where the waveguide width has not been changed and to realize a single mode, even when the waveguide width in the transverse direction is narrowed and difference in refractive index between the waveguide and the clad layer is increased.

In such a structure however, coupling efficiency between the optical fiber array and the optical waveguide device or between a surface-emitting semiconductor laser array and the optical waveguide device is lowered in exchange for the suppression of bend loss in waveguides.

When the lowering of coupling efficiency between the optical fiber array and the optical waveguide device or between the surface-emitting semiconductor laser array and the optical waveguide device is large in comparison with the improvement of the optical utilization efficiency caused by the suppression of bend loss in waveguides, the following structure is adopted. That is, as shown in FIGS. 9, 11, and 14, at the input section 16 of the optical waveguide device 35, the waveguide widths 19 and 20 in the vertical and transverse directions are equalized with each other; the refractive index difference between a core layer and a clad layer is also equalized between in the vertical direction 21 and in the transverse direction 22; and a mode field diameter of a beam propagating in the optical waveguide device input section and a mode field diameter of a beam propagating in an optical fiber, or a mode field diameter of a beam propagating in the optical waveguide device input section and the mode field diameter of a beam emitted from the surface-emitting semiconductor laser array, are equalized with each other; and at the joint between the input section 16 and the waveguide curved area 15, a taper 18 is formed to a waveguide (core layer) width 19 in the transverse direction 22 in order to suppress mode conversion loss.

The taper 18 is formed so as to narrow toward the waveguide curved area 15 from the input section 26.

By so doing, it is possible to lower bend loss in waveguides while the joint between the optical fiber array and the optical waveguide device or between the surface-emitting semiconductor laser array element and the optical waveguide device is maintained in an optimum state.

Further, in the optical waveguide device output section 17 too, by employing a structure identical to that at the input section, it is possible to make the diameter of an outgoing beam symmetrical in the vertical and transverse directions 21 and 22, and to generate a small pitch multi-beam having a small-pitch ration in an alignment in relation to the beam diameter in the multi-beam, namely a multi-beam where beams are aligned in a very dense state. Hence, the influence of aberration in an optical system decreases even when the number of beams is large.

Figure 1:
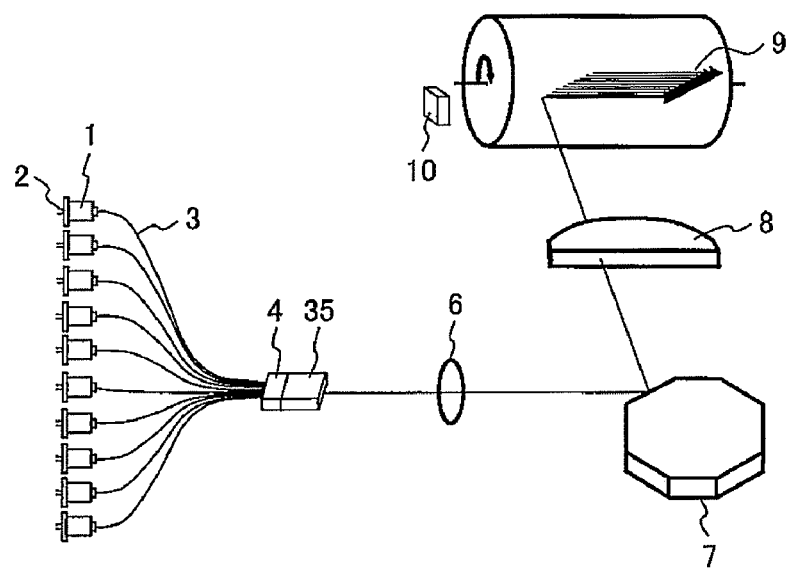
FIG. 1 is a schematic view showing an optical system in an optical recording device to modulate a multi-beam emitted from an optical waveguide device according to the present invention, and scan a photosensitive material with the multi-beam.

An example wherein the multi-beam generating device shown in FIG. 8 or 9 is applied to a laser printer of the present invention as an optical recording device is shown in FIG. 1.

The semiconductor laser module 1 leads a laser beam from a semiconductor laser 2 to an optical fiber 3.

A plurality of optical fibers are aligned in a row as shown in FIG. 7 and connected to the input end face of an optical waveguide device 35 as explained earlier.

Figure 2:
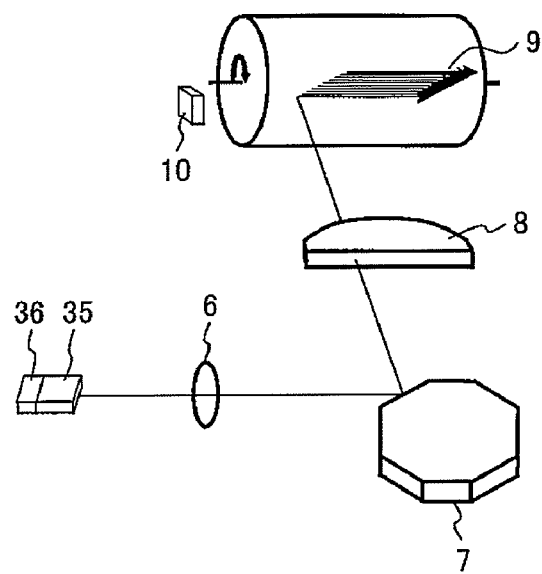
FIG. 2 is a schematic view showing another optical system in an optical recording device to modulate a multi-beam emitted from an optical waveguide device according to the present invention, and scan a photosensitive material with the multi-beam.
Figure 3:
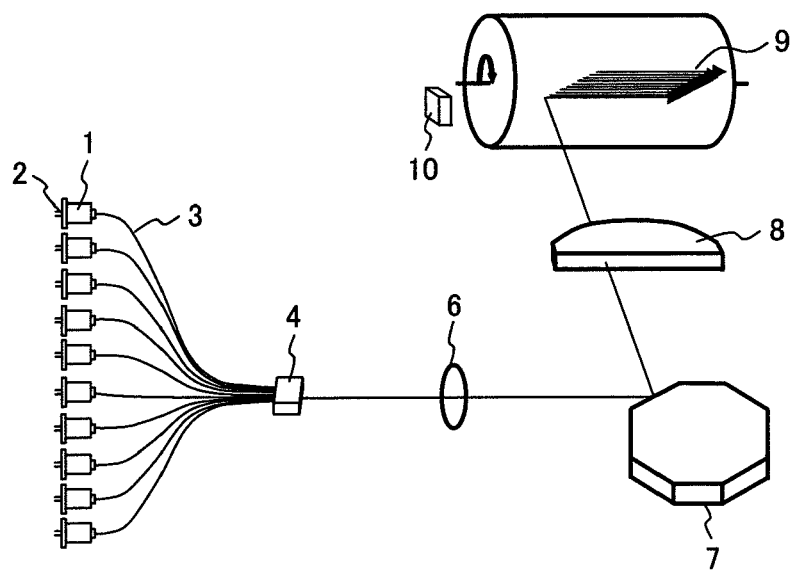
FIG. 3 is a schematic view showing an optical system in an optical recording device to modulate a multi-beam emitted from an optical fiber array, and scan a photosensitive material with the multi-beam.
Figure 4:
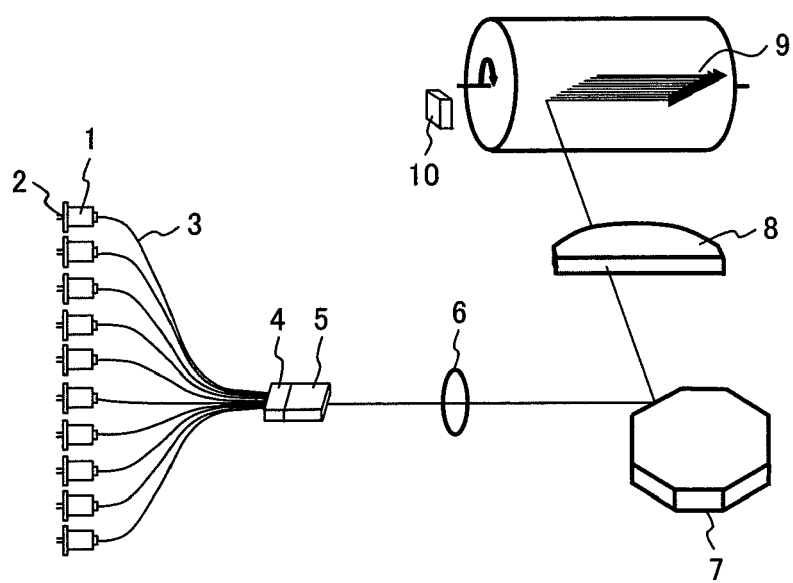
FIG. 4 is a schematic view showing an optical system in an optical recording device to modulate a multi-beam emitted from an optical waveguide device, and scan a photosensitive material with the multi-beam.
Figure 5:
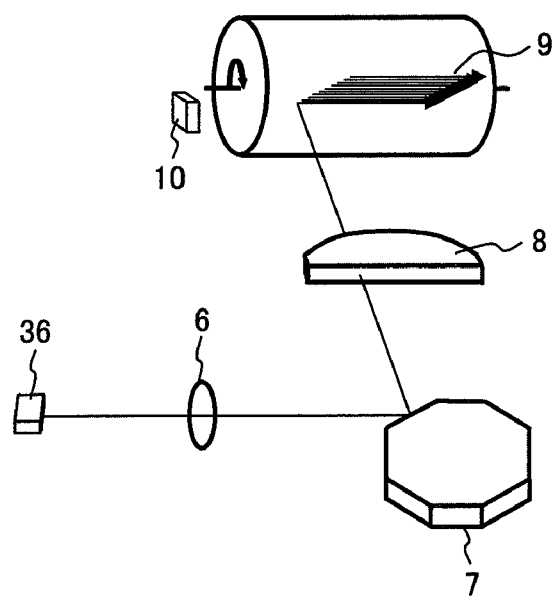
FIG. 5 is a schematic view showing an optical system in an optical recording device to modulate a multi-beam emitted from a semiconductor laser array, and scan a photosensitive material with the multi-beam.
Figure 6:
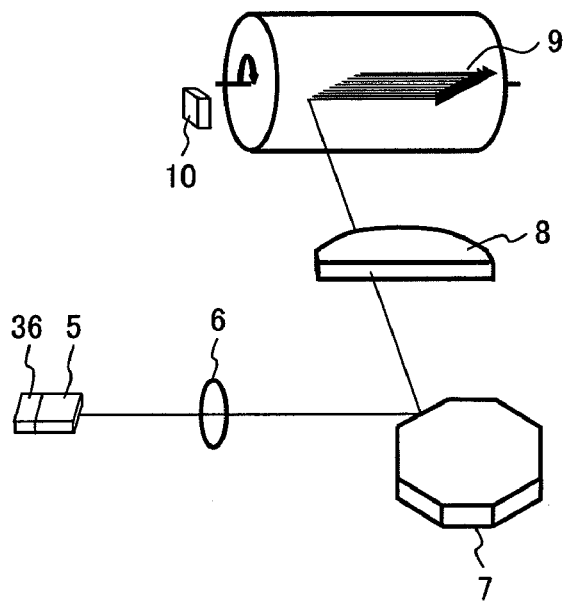
FIG. 6 is a schematic view showing an optical system in an optical recording device to modulate a multi-beam emitted from an optical waveguide device, and scan a photosensitive material with the multi-beam.

An example wherein the multi-beam generating device shown in FIG. 10 or 11 is applied to a laser printer of the present invention as an optical recording device is shown in FIG. 2.

A multi-beam emitted from an optical waveguide device 35, to which laser beams are led from a semiconductor laser array 36, is converted into parallel beams with a coupling lens 6, and optically scanned on a photosensitive drum 9 with a rotating polygonal mirror 7. A photo-sensor 10 is used for a detection of a scanning position of a multi-laser beam.

A interval (pitch) each between adjacent beam-spots in beam-spot rows on the photosensitive drum 9 is larger than the size of the beam spot and hence it is designed such that the direction of the alignment of the beam-spot rows may be set obliquely to the direction of beam scanning and thereby nearness scanning lines can be formed.

FIGS. 15A, 15B, 15C, 15D, 15E, 15F, 15G, 15H and FIGS. 16A, 16B, 16C, 16D, 16E, 16F, 16G, 16H show methods for producing an optical waveguide device according to the present invention.

On a Si substrate 23, an under clad layer 24 comprising a quartz (GPSG) film formed by doping Ge and P is formed, and a core layer 29 comprising a quartz (GPSG) film formed by doping Ge and P of amounts different from the amounts in the former quartz film is formed consecutively.

The thicknesses of the under clad layer 24 and the core layer 29 are set at 15 μm and 3 μm, respectively. On this occasion, the refractive index difference Δ between the core layer 29 and the under clad layer 24 is set at about 0.1 to 0.2%.

After that, a film of a masking material such as Cr is formed on the front face of the core layer and a pattern 30 of the masking material is formed through a lithography process by photo-resist.

Thereafter, dry etching is applied and a waveguide pattern having the waveguide width in transverse direction 19 of about 2 μm is formed in the waveguide curved area 15.

Successively, a clad layer 25 of GPSG, the refractive index difference Δ between the GPSG and the waveguide layer being 0.2 to 0.4%, is formed.

At the step, a structure where only the clad layer portion on the waveguide pattern builds up is formed. After polishing is applied in order to flatten the build up portion 34, dry etching is applied up to the upper face of the waveguide and the clad layer up to the upper face of the waveguide is removed.

Thereafter, the masking material 30 on the waveguide is removed and a GPSG film 27, the refractive index difference Δ between the GPSG film 27 and the waveguide being 0.1 to 0.2%, is formed.

By so doing, it is possible to manufacture an optical waveguide device where the refractive index difference between the waveguide and the clad layer is larger in the transverse direction 22 than in the vertical direction 21 and the waveguide width is narrower in the transverse direction 19 than in the vertical direction 20.

In order that the waveguide width and the refractive index difference Δ at the input section 16 and the output section 17 of an optical waveguide device are symmetrical in the transverse and vertical directions, the following process is adopted. That is: putting a cover mask 33 onto the input section 16 and the output section 17 after the end of the dry etching of a core layer; forming an over clad layer 25 at the center portion; removing the over clad layer 25 formed at the center portion up to the upper face of the waveguide by dry etching; thereafter removing the cover mask 33; and thus forming a GPSG film with the refractive index difference Δ between the GPSG and the waveguide being 0.1 to 0.2%, as the over clad layer 27.

On this occasion, the waveguide widths in the transverse direction at the input and output sections are set at 3 μm.

What is claimed is:

1. A multi-beam generating device comprising a plurality of semiconductor lasers, a plurality of optical fibers to propagate laser beams emitted by the semiconductor lasers, an optical fiber array to propagate the laser beams having passed through the optical fibers, and an optical waveguide device provided with a plurality of waveguides to propagate the laser beams having passed through the optical fiber array, wherein each waveguide with a core layer and a clad layer has an input section where a laser beam enters, a curved area in the waveguide, and an output section where the laser beam emits, wherein, in the curved area of the waveguide, a width of the waveguide is narrower in the transverse direction than in the vertical direction, a difference in refractive index is larger in the transverse direction than in the vertical direction, and a pitch between adjacent waveguides in the arrangement of the waveguides is narrower on the output section side than on the input section side, and wherein, at both the input and output sections, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

2. A multi-beam generating device having a semiconductor laser array and an optical waveguide device provided with a plurality of waveguides to propagate laser beams emitted from the semiconductor laser array, wherein each waveguide with a core layer and a clad layer has an input section where a laser beam enters, a curved area in the waveguide, and an output section where the laser beam emits, wherein, in the curved area of the waveguide, a width of the waveguide is narrower in the transverse direction than in the vertical direction, a difference in refractive index is larger in the transverse direction than in the vertical direction, and a pitch between adjacent waveguides in the arrangement of the waveguides is narrower on the output section side than on the input section side, and wherein, at both the input and output sections, the width of the core layer on the outer end side in the transverse direction is identical to that in the vertical direction, the difference in refractive index between the core layer and the clad layer in the transverse direction is identical to that in the vertical direction, and a taper is formed such that the width of the core layer in the transverse direction narrows toward the curved area in the waveguide.

3. A multi-beam generating device according to claim 2, wherein the semiconductor laser array is a surface-emitting semiconductor laser array.

4. A multi-beam generating device according to any one of claims 1, 2 and 3, wherein the semiconductor lasers are violet semiconductor lasers.

5. An optical recording device that carries out optical recording by: emitting laser beams from a multi-beam generating device according to any one of claims 1, 2 and 3; and scanning an optical recording material in a multi-beam.

* * * * *